United States Patent
Zhao et al.

(10) Patent No.: US 11,314,708 B2
(45) Date of Patent: *Apr. 26, 2022

(54) HETEROGENEOUS TYPE DATABASE STORAGE SYSTEM BASED ON OPTICAL DISC, AND METHOD FOR USING SYSTEM

(71) Applicants: Tianyu Zhao, Jinan (CN); Zongpeng Tao, Beijing (CN); Guangyi Tao, Beijing (CN); Chunyang Liu, Beijing (CN)

(72) Inventors: Tianyu Zhao, Jinan (CN); Zongpeng Tao, Beijing (CN); Guangyi Tao, Beijing (CN); Chunyang Liu, Beijing (CN)

( * ) Notice: Subject to any disclaimer, the term of this patent is extended or adjusted under 35 U.S.C. 154(b) by 68 days.

This patent is subject to a terminal disclaimer.

(21) Appl. No.: 16/877,019

(22) Filed: May 18, 2020

(65) Prior Publication Data
US 2020/0278951 A1  Sep. 3, 2020

Related U.S. Application Data

(62) Division of application No. 16/086,604, filed as application No. PCT/CN2016/000634 on Nov. 15, 2016, now Pat. No. 10,678,764.

(30) Foreign Application Priority Data

Mar. 21, 2016 (CN) .......................... 201610160652.0

(51) Int. Cl.
*G06F 7/00* (2006.01)
*G06F 16/00* (2019.01)
*G06F 16/22* (2019.01)
*G06F 16/25* (2019.01)
*G06F 16/28* (2019.01)

(52) U.S. Cl.
CPC .............. *G06F 16/22* (2019.01); *G06F 16/25* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 6,167,393 A | * | 12/2000 | Davis, III | ............... G06F 16/28 |
| 2010/0063971 A1 | * | 3/2010 | Cragun | ................. G06F 16/907 707/741 |
| 2013/0297614 A1 | * | 11/2013 | Leinberg | ................. G06F 16/14 707/741 |

* cited by examiner

*Primary Examiner* — Tuan A Pham
(74) *Attorney, Agent, or Firm* — Novoclaims Patent Services LLC; Mei Lin Wong

(57) ABSTRACT

A heterogeneous database storage system based on optical disk includes a magnetic disk storage device and an optical disk storage device connecting, via a data connection, to a server. A relational database management system, a non-relational database management system, a data processor and a database connector are installed on the server. Fields of a record are divided into two parts by the data processor. A part of the fields are in a relational database, and the other part of the fields are in a non-relational database. Fields of the relational database constitute a subrecord of the relational database, and Fields of the non-relational database constitute a subrecord of the non-relational database. The subrecord of the relation database and the corresponding subrecord of the non-relational database form an integral record by the database connector.

2 Claims, 6 Drawing Sheets

HETEROGENEOUS TYPE DATABASE STORAGE SYSTEM BASED ON OPTICAL DISC, AND METHOD FOR USING SYSTEM

CROSS REFERENCE OF RELATED APPLICATION

This is a divisional application of a non-provisional application Ser. No. 16/086,604, filing date Nov. 15, 2016, which is a national phase national application of an international patent application number PCT/CN2016/000634 with a filing date of Nov. 15, 2016, which claimed priority of a foreign application number CN 201610160652.0 with a filing date of Mar. 21, 2016 in China. The contents of these specifications, including any intervening amendments thereto, are incorporated herein by reference.

BACKGROUND OF THE PRESENT INVENTION

Field of Invention

The present invention relates to a database storage system and method, and particularly relates to a storage system and method combining a relational database and a non-relational database.

Description of Related Arts

Database types can be divided into relational type and non-relational type according to database storage technology. The data managed by the relational database can be express logically using a planar (two-dimensional) lines list structure. A line represents a record. Data of each column is equivalent to data of the same field in different records. It can be designed that a database consists of a number of two dimensional tables. Connection among different tables is achieved through a relationship. Therefore, the relational database is generally adopted for storing and managing structured data. The data storage of the relational database has advantage of transaction processing consistency and read-write real-time performance, but it is critical for data throughput capability of the magnetic disk system in response to concurrent data. It causes that search efficiency cannot be optimized for querying massive data of two dimensional tables. The weakness makes scalability and availability of the database be limited. The adjustment of the structure of the two-dimensional table and the structure among the tables often involves shutdown maintenance and data migration.

The non-relational database organizes data in files with unlimited space, which breaks through strict table structure of the relational database, and solves the problem of difficultly expressing complex nesting data structure because of simple model of the relational database. The non-relational database can hold data with various formats and types, including structured data, semi-structured data, and unstructured data. The non-relational database can realize key-value corresponding storage with high concurrency performance, and use files as storage units. The structure of the non-relational database has not to be fixed. Each data record can have different fields, and some key-value pairs can be increased according to the need. In this way, it cannot be confined to a fixed structure. It can reduce cost of time and space for storing data, and adapt to increase of data volume and change of data structure. The current epidemic non-relational databases include TRIP, Redis, Tokyo Cabinet, Cassandra, MongoDB, Dynomite, HBase, CouchDB ect.

But it is clear that the advantages of the non-relational database cannot replace the advantages of the relational database.

Records composed of structured data and unstructured data are generally managed by the relational database or the non-relational database. For records which consist of the structured data and the unstructured data managed by the relational database, the structured data is generally stored in the relational database, and the unstructured data is stored in the file server by a file system and hooked to the relational database. The hooking method affects integrity and security of the data. It is difficult to manage a large number of unstructured data and backup database. Only when capacity of the unstructured data is relatively small, the unstructured data can be stored in BLOB field. This method is not suitable for large capacity of non-structured data. For records which consist of the structured data and the unstructured data managed by the non-relational database, all structured data and unstructured data can be input into the non-relational database, which can completely eliminate the defect of hooking unstructured data to the relational database, and ensure integrity and security of the data. But in some cases, the effective of processing the structured data by the non-relational database is lower than that by the relational database, it should not adopt the non-relational database to manage the structured data.

For records which consist of the structured data and the unstructured data, the unstructured data that must be preserved for long-term is not suitable for being stored using magnetic storage and electrical storage. Therefore, the problems of their storage and use are challenging for the design of software and hardware of the database system.

In the patent application named "Database Storage System based on Optical Disk and Method Using the System" with the patent application number CN 201210431169.3, a technical solution is provided, in which the database is hierarchically stored using the magnetic disk storage device and the optical disk storage device. The way of solution is provided for the various applications to access and use the database and data on the optical disk. It disclosed that the field structure generation module, the record index generation module, the storage space allocation module, the storage space status module, the record linkage module of the database management system can obtain basic data structure and data structure parameters of the database. On this basis, it is possible to store hierarchically the structured data and the unstructured data in the magnetic disk storage device and the optical disk storage device using various types of databases. It improves the performance and the efficiency of database storage.

SUMMARY OF THE PRESENT INVENTION

An object of the present invention is to provide a heterogeneous type database storage system based on optical disk in order to solve the technical problems of the performance degradation of processing data when the structured data and the unstructured data of data record are processed by single type database.

Another object of the present invention is to provide the methods for storing data using the above mentioned heterogeneous type database storage system in order to solve the technical problems of storing data of data record with different structure type using the magnetic disk and the optical disk in combination with database type.

According to the present invention, the heterogeneous type database storage system based on optical disk comprises a server, a magnetic disk storage device and an optical disk storage device connecting to the server via data connection, a relational database management system, a non-relational database management system, a data processor and a database connector are installed on the server.

The relational database management system is arranged for completing relational database management and data management of the magnetic disk storage device in response to data requests.

The non-relational database management system is arranged for completing non-relational database management and data management of the magnetic disk storage device and the optical disk storage device in response to data requests.

The data processor is arranged for configuring fields of the relational database and fields of the non-relational database, inputting data of the corresponding fields into the relational database and the non-relational database respectively in response to data requests.

The database connector is arranged for creating data connection of the relational database and the non-relational database in response to data requests.

Fields of a record stored in a database are divided into two parts by the data processor. A part of the fields are in the relational database, and the other part of the fields are in the non-relational database. The fields of the relational database constitute a subrecord of the relational database, the fields of the non-relational database constitute a subrecord of the non-relational database. The subrecord of the relation database and the corresponding subrecord of the non-relational database form an integral record through the database connector.

The relational database management system comprises a field structure generation module of relational database, a record index generation module of relational database, a storage space allocation module of relational database, a storage space status module of relational database, a record linkage module of relational database, a database structure generation module of relational database.

The field structure generation module of relational database reads field structure information of each subrecord of the relational database and writes the field structure information of each subrecord of the relational database into the relational database management system, wherein the field structure information comprises a data type and a data length of each field of the subrecord.

The record index generation module of relational database records index information of each subrecord of the relational database and writes the index information of each subrecord of the relational database into the relational database management system, wherein the index information comprises modification time and modification content of each field of the subrecord.

The storage space allocation module of relational database records position information of allocated standard storage units of each subrecord in the relational database, and writes the position information into the relational database management system.

The storage space status module of relational database records free space information of the allocated standard storage units in the relational database, and writes the free space information into the relational database management system.

The record linkage module of relational database combines the field structure information, the index information, the position information and the space information of the standard storage units of each subrecord of the relational database to form database properties data of the relational database, and writes the database properties data of the relational database into the relational database management system.

The database structure generation module of relational database forms an independent data file for the database structure of the relational database, wherein the relational database management system creates a relational database having the same database structure in a magnetic disk storage device based on the independent data file.

The non-relational database management system comprises a field structure generation module of non-relational database, a record index generation module of non-relational database, a storage space allocation module of non-relational database, a storage space status module of non-relational database, a record linkage module of non-relational database, a database structure generation module of non-relational database, a record split module of non-relational database.

The field structure generation module of non-relational database reads field structure information of each subrecord of the non-relational database and writes the field structure information of each subrecord of the non-relational database into the non-relational database management system, wherein the field structure information comprises a data type and a data length of each field of the subrecord.

The record index generation module of non-relational database records index information of each subrecord of the non-relational database and writes the index information of each subrecord of the non-relational database into the non-relational database management system, wherein the index information comprises modification time and modification content of each field of the subrecord.

The storage space allocation module of non-relational database records position information of allocated standard storage units of each subrecord in the non-relational database, and writes the position information into the non-relational database management system.

The storage space status module of non-relational database records free space information of the allocated standard storage units in the non-relational database, and writes the free space information into the non-relational database management system.

The record linkage module of non-relational database combines the field structure information, the index information, the position information and the space information of the standard storage units of each subrecord of the non-relational database to form database properties data of the non-relational database, and writes the database properties data of the non-relational database into the non-relational database management system.

The database structure generation module of non-relational database forms an independent data file for the database structure of the non-relational database, wherein the non-relational database management system creates optical disk non-relational databases having a database structure identical to the magnetic disk non-relational database on optical disks or creates a magnetic disk non-relational database having the same database structure in other magnetic disk storage device based on the independent data file.

The record split module of non-relational database processes a subrecord splitting process for the subrecords of the non-relational database according to the command of the non-relational database management system, wherein the record splitting process is processed in a subrecord unit, in which the database properties data is read, the position and the amount of data of each field in the subrecords are determined, the subrecords conforming to the command parameters are marked, and the marked information is written into the non-relational database management system.

The data processor comprises a filed configuration model, a data input model of relational database, a data input model of non-relational database.

The filed configuration model configures fields of the relational database and fields of the non-relational database based on the data type and the data length of each field of records, and writes field configuration information into the relational database management system and the non-relational database management system respectively.

The data input model of relational database writes data of the corresponding fields into the relational database based on the fields of the relational database configured by the filed configuration model according to the command of the relational database management system.

The data input model of non-relational database writes data of the corresponding fields into the non-relational databases on optical disks or the non-relational database in a magnetic disk based on the fields of the non-relational database configured by the filed configuration model according to the command of the non-relational database management system.

The database connector comprises a database connection model which connects a subrecord of the relation database and a corresponding subrecord of the non-relational database to form an integral record according to the command of the relational database management system and the non-relational database management system.

A method for storing data into the relational database and the non-relational database in a magnetic disk storage device using the above mentioned heterogeneous type database storage system based on optical disk, wherein the steps are as follows: when transferring data forward, requests are made to configure fields of the relational database for the data processor by the relational database management system, then the fields of the relational database are configured by the data processor based on the data type and the data length of each field of records; requests are made to configure fields of the non-relational database for the data processor by the non-relational database management system, then the fields of the non-relational database are configured by the data processor based on the data type and the data length of each field of records; requests are made to write data of the corresponding fields into the relational database for the data processor by the relational database management system, then the data of the corresponding fields is written into the relational database by the data processor; requests are made to write data of the corresponding fields into the non-relational database for the data processor by the non-relational database management system, then the data of the corresponding fields is written into the non-relational database by the data processor; when transferring data backward, requests are made to configure fields of the relational database for the data processor by the relational database management system, then information of the configured fields of the relational database is returned by the data processor, and the information of the configured fields of the relational database is obtained by the relational database management system; requests are made to configure fields of the non-relational database for the data processor by the non-relational database management system, then information of the configured fields of the non-relational database is returned by the data processor, and the information of the configured fields of the non-relational database is obtained by the non-relational database management system; requests are made to write data of the corresponding fields into the relational database for the data processor by the relational database management system, then information of data written into the relational database is returned by the data processor, and the information of data written into the relational database is obtained by the relational database management system; requests are made to write data of the corresponding fields into the non-relational database for the data processor by the non-relational database management system, then information of data written into the non-relational database is returned by the data processor, and the information of data written into the non-relational database is obtained by the non-relational database management system; the data written into the relation database and the corresponding data written into the non-relational database form data of integral records by the database connector.

A method for creating a relational database in a magnetic disk and a non-relational database directly on an optical disk using the above mentioned heterogeneous type database storage system based on optical disk, wherein the steps are as follows: in step 100, creating a magnetic disk relational database file in a magnetic disk storage device through the database structure generation module of relational database by the relational database management system; in step 105, configuring fields of the relational database by the filed configuration model; in step 110, writing data of the fields of the corresponding subrecords of the relational database into the relational database by the data input model of relational database according to the command of the relational database management system; in step 115, writing the field structure information of the subrecords into the magnetic disk relational database file by the field structure generation module of relational database; in step 120, writing the index information of the subrecords into the magnetic disk relational database file by the record index generation module of relational database; in step 125, writing the position information of the standard storage units of the subrecords into the magnetic disk relational database file by the storage space allocation module of relational database; in step 130, recording the space information of the standard storage units by the storage space status module of relational database; in step 135, forming database properties data of the magnetic disk relational database by the record linkage module of relational database, and finishing the creation of the relational database and the storage of the subrecords in the magnetic disk storage device; in step 140, obtaining capacity parameters of optical disk storage media by the non-relational database management system; in step 145, creating a non-relational database file in the optical disk storage media by the database structure generation module of non-relational database; in step 150, configuring fields of the non-relational database by the filed configuration model; in step 155, increasing subrecords of the non-relational database into the non-relational database file on the optical disk storage media through the data input module of non-relational database, retaining the written field structure information of the corresponding subrecords through the field structure generation module of non-relational database, retaining the index information of the corresponding subrecords through the record index generation module of non-relational database, retaining the position information of the standard storage units of the corresponding subrecords through the storage space allocation module of non-relational database, retaining the recorded space information of the standard storage units through the storage space status module of non-relational database, and retaining the generated database properties data of the corresponding non-relational database through the record linkage module of non-relational database by the non-relational database management system; in step 160, determining whether to reach the capacity value of the storage space, if yes, executing step 170, otherwise executing step 165; in step 165, repeating step 155, updating the retained database properties data of the non-relational database; in step 170, when the capacity of the non-relational database reaches the capacity value of the storage space of the optical disk, writing the retained database properties data of the non-relational database into the non-relational database on the optical disk by the non-relational database management system, and completing the creation of the non-relational database and the storage of the subrecords on the optical disk; in step 175, connecting a subrecord of the relation database and a corresponding subrecord of the non-relational database to form an integral record through the database connection model according to the command of the relational database management system and the non-relational database management system.

A method for creating a relational database in a magnetic disk, and transferring a non-relational database created in the magnetic disk onto optical disks using the above mentioned heterogeneous type database storage system based on optical disk, wherein the steps are as follows: in step 200, creating a magnetic disk relational database file in a magnetic disk storage device through the database structure generation module of relational database by the relational database management system; in step 205, configuring fields of the magnetic disk relational database by the filed configuration model; in step 210, writing data of the fields of the corresponding subrecords of the relational database into the relational database by the data input model of relational database according to the command of the relational database management system; in step 215, writing the field structure information of the subrecords into the magnetic disk relational database file by the field structure generation module of relational database; in step 220, writing the index information of the subrecords into the magnetic disk relational database file by the record index generation module of relational database; in step 225, writing the position information of the standard storage units of the subrecords into the magnetic disk relational database file by the storage space allocation module of relational database; in step 230, recording the space information of the standard storage units by the storage space status module of relational database; in step 235, forming database properties data of the magnetic disk relational database by the record linkage module of relational database, and finishing the creation of the relational database and the storage of the subrecords in the magnetic disk storage device; in step 240, obtaining capacity parameters of optical disk storage media by the non-relational database management system; in step 245, splitting the non-relational database in the magnetic disk according to the capacity of the optical disk storage media through the record split module of non-relational database by the non-relational database management system, and forming marked information of the subdatabases; in step 250, creating a non-relational database file on the corresponding optical disk by the database structure generation module of non-relational database; in step 255, configuring fields of the non-relational database on the corresponding optical disk by the filed configuration model according to fields of the non-relational database in the magnetic disk; in step 260, writing data of fields of the corresponding subrecords into the non-relational database on the corresponding optical disk by the data input module of non-relational database; in step 265, writing the field structure information of the corresponding subrecords into the non-relational database file on each optical disk through the field structure generation module of non-relational database; in step 270, writing the index information of the corresponding subrecords into the non-relational database file on each optical disk through the record index generation module of non-relational database; in step 275, writing the position information of the standard storage units of the corresponding subrecords into the non-relational database file on each optical disk through the storage space allocation module of non-relational database; in step 280, recording the space information of the standard storage units through the storage space status module of non-relational database; in step 285, forming database properties data of the corresponding non-relational database on each optical disk through the record linkage module of non-relational database, and completing the creation of the non-relational database and the storage of the subrecords on each optical disk; in step 290, connecting a subrecord of the relation database in the magnetic disk and a corresponding subrecord of the non-relational database on the corresponding optical disk to form an integral record through the database connection model according to the command of the relational database management system and the non-relational database management system.

Fields of a record can be divided into two parts using the heterogeneous type database storage system based on optical disk of the present invention. The fields of structured data are in a relational database and the fields of unstructured data are in a non-relational database. The unstructured data is not hooked to the relational database, which makes all data be stored in databases. The fields of the relational database constitute a subrecord of the relational database, and the fields of the non-relational database constitute a subrecord of the non-relational database. The subrecord of the relation database and the corresponding subrecord of the non-relational database form an integral record by connecting the relational database and the non-relational database to ensure the integrity of the record. Being able to make full use of advantage and characteristic of the relational database and the non-relational database, the structured data in the magnetic disk is searched by the relational database management system, then the unstructured data of the same record can be retrieved by the non-relational database management system, which improves the storage capacity and security of the relational database. For an existing relational database, the unstructured data hooked to the relational database can be transferred and stored into the non-relational database using the method for processing data of the present invention.

Using the method of this invention, the structured data of records is stored in a relational database, and the unstructured data of the records is stored in a non-relational database. The relational database is created in the magnetic disk. The non-relational database management system splits a huge magnetic disk non-relational database into several subdatabases having the same structure definition and data integrity, and the subdatabase on each optical disk can accept the management of the non-relational database management system, which makes the subrecord of the relation database in the magnetic disk and the corresponding subrecord of the non-relational database on the corresponding optical disk be able to form an integral record. The unstructured data of records is stored in large scale using the features of the huge capacity and high security of storing data of optical disk storage devices.

Using the method of this invention, for electronic archives that must be preserved for long-term, structured data of the electronic archives is stored in a relational database in a magnetic disk, and unstructured data of the electronic archives is stored in a non-relational database on an optical disk. The structured data in the magnetic disk is searched by the relational database management system, then the unstructured data of the electronic archives of the non-relational database on the optical disk can be retrieved by the non-relational database management system, which provides a good approach for realizing that the structured data and the unstructured data of the electronic archives are hierarchically stored using the magnetic disk storage device and the optical disk storage device. The cost of constructing storage system of the electronic archives database can be significantly decreased, and the energy consumption can be reduced.

The present invention is further illustrated through the following embodiments and the accompanying drawings.

DETAILED DESCRIPTION OF THE PREFERRED EMBODIMENT

Figure 1:
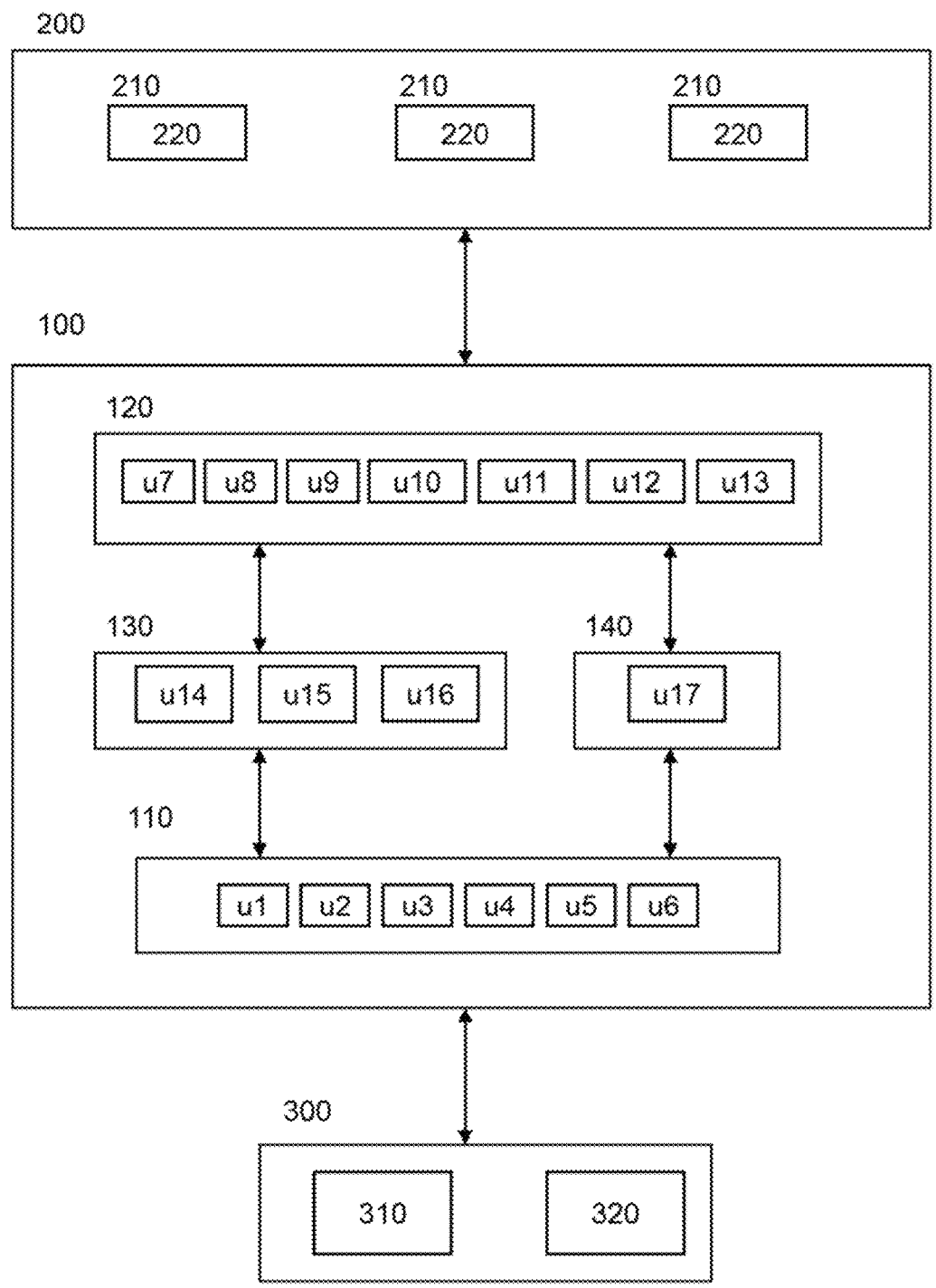
FIG. 1 is a schematic diagram of the structure according to the preferred embodiment of the heterogeneous type database storage system based on optical disk of the present invention.
Figure 2:
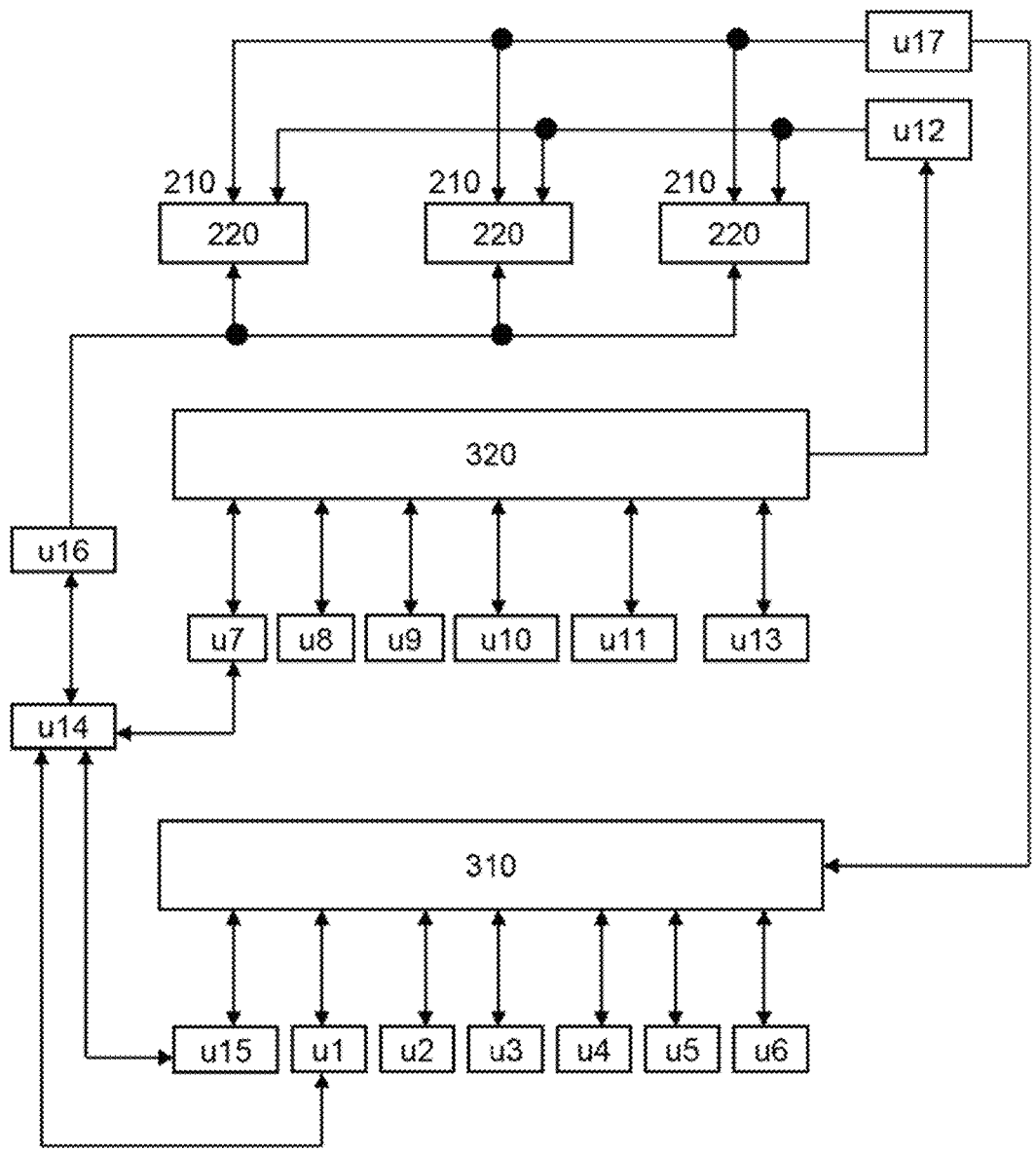
FIG. 2 is a schematic diagram of the structure of the database management system according to the preferred embodiment of the heterogeneous type database storage system based on optical disk of the present invention.

According to the preferred embodiment of the present invention, which is shown in FIG. 1 and FIG. 2, a heterogeneous type database storage system based on optical disk comprises a serve (100), a magnetic disk storage device (300) and an optical disk storage device (200) connecting to the server via data connection. A relational database management system (110), a non-relational database management system (120), a data processor (130) and a database connector (140) are installed on the server (100). A magnetic disk relational database (310) and a magnetic disk non-relational database (320) are created in the magnetic disk storage device (300). The embodiments also comprise a jukebox (200) as an optical disk storage device which completes exchanging optical disks in optical disk drives using an optical disk exchange mechanism, reading and writing data on each optical disk using the optical disk drives. The relational database management system (110) uses SQL server, the non-relational database management system (120) uses TRIP, the magnetic disk storage device (300) uses RAID magnetic disk array.

The server (100) performs data connection with the jukebox (200) and the magnetic disk storage device (300) respectively. The relational database management system (110) responds to data requests, and creates a magnetic disk database (310) file on the magnetic disk, and manages subrecords of the relational database. The non-relational database management system (120) responds to data requests, and creates a magnetic disk non-relational database (320) file in the magnetic disk and optical disk non-relational databases (220) on optical disks (210), and manages subrecords of the non-relational databases. The jukebox (200) completes exchanging the optical disks (210) in the optical disk drives according to the corresponding data command of the non-relational database management system (120).

The relational database management system (110) comprises a field structure generation module of relational database (u1), a record index generation module of relational database (u2), a storage space allocation module of relational database (u3), a storage space status module of relational database (u4), a record linkage module of relational database (u5), a database structure generation module of relational database (u6).

The field structure generation module of relational database (u1) reads field structure information of each subrecord of the relational database and writes the field structure information of each subrecord of the relational database into the relational database management system (110), wherein the field structure information comprises a data type and a data length of each field of the subrecord.

The record index generation module of relational database (u2) records index information of each subrecord of the relational database and writes the index information of each subrecord of the relational database into the relational database management system (110), wherein the index information comprises modification time and modification content of each field of the subrecord.

The storage space allocation module of relational database (u3) records position information of allocated standard storage units of each subrecord in the relational database, and writes the position information into the relational database management system (110).

The storage space status module of relational database (u4) records free space information of the allocated standard storage units in the relational database, and writes the free space information into the relational database management system (110).

The record linkage module of relational database (u5) combines the field structure information, the index information, the position information and the space information of the standard storage units of each subrecord of the relational database to form database properties data of the relational database, and writes the database properties data of the relational database into the relational database management system (110).

The database structure generation module of relational database (u6) forms an independent data file for the database structure of the relational database, wherein the relational database management system creates a relational database (310) having the same database structure in a magnetic disk storage device based on the independent data file.

The non-relational database management system comprises a field structure generation module of non-relational database (u7), a record index generation module of non-relational database (u8), a storage space allocation module of non-relational database (u9), a storage space status module of non-relational database (u10), a record linkage module of non-relational database (u11), a database structure generation module of non-relational database (u12), a record split module of non-relational database (u13).

The field structure generation module of non-relational database (u7) reads field structure information of each subrecord of the non-relational database and writes the field structure information of each subrecord of the relational database into the non-relational database management system (120), wherein the field structure information comprises a data type and a data length of each field of the subrecord.

The record index generation module of non-relational database (u8) records index information of each subrecord of the non-relational database and writes the index information of each subrecord of the non-relational database into the non-relational database management system (120), wherein the index information comprises a modification time and a modification content of each field of the subrecord.

The storage space allocation module of non-relational database (u9) records position information of allocated standard storage units of each subrecord in the non-relational database, and writes the position information into the non-relational database management system (120).

The storage space status module of non-relational database (u10) records free space information of the allocated standard storage units in the non-relational database, and writes the free space information into the non-relational database management system (120).

The record linkage module of non-relational database (u11) combines the field structure information, the index information, the position information and the space information of the standard storage units of each subrecord of the non-relational database to form database properties data of the non-relational database, and writes the database properties data of the non-relational database into the non-relational database management system (120).

The database structure generation module of non-relational database (u12) forms an independent data file for the database structure of the non-relational database (120), wherein the database management system creates optical disk non-relational databases (220) having a database structure identical to the magnetic disk non-relational database on optical disks or creates a magnetic disk non-relational database (320) having the same database structure in other magnetic disk storage device based on the independent data file.

The record split module of non-relational database (u13) processes a subrecord splitting process for the subrecords of the non-relational database according to the command of the non-relational database management system (120), wherein the record splitting process is processed in a subrecord unit, in which the database properties data is read, the position and the amount of data of each field in the subrecords are determined, the subrecords conforming to the command parameters are marked, and the marked information is written into the non-relational database management system (120).

The data processor comprises a filed configuration model (u14), a data input model of relational database (u15) and a data input model of non-relational database (u16).

The filed configuration model (u14) configures fields of the relational database and fields of the non-relational database based on the data type and the data length of each field of records, and writes field configuration information into the relational database management system (110) and the non-relational database management system (120) respectively.

The data input model of relational database (u15) writes data of the corresponding fields into the relational database (310) based on the fields of the relational database configured by the filed configuration model according to the command of the relational database management system (110).

The data input model of non-relational database (u16) writes data of the corresponding fields into the non-relational databases (220) on optical disks or the non-relational database (320) in a magnetic disk based on the fields of the non-relational database configured by the filed configuration model according to the command of the non-relational database management system (120).

The database connector comprises a database connection model (u17) which connects a subrecord of the relation database and a corresponding subrecord of the non-relational database to form an integral record according to the command of the relational database management system (110) and the non-relational database management system (120).

Figure 3:
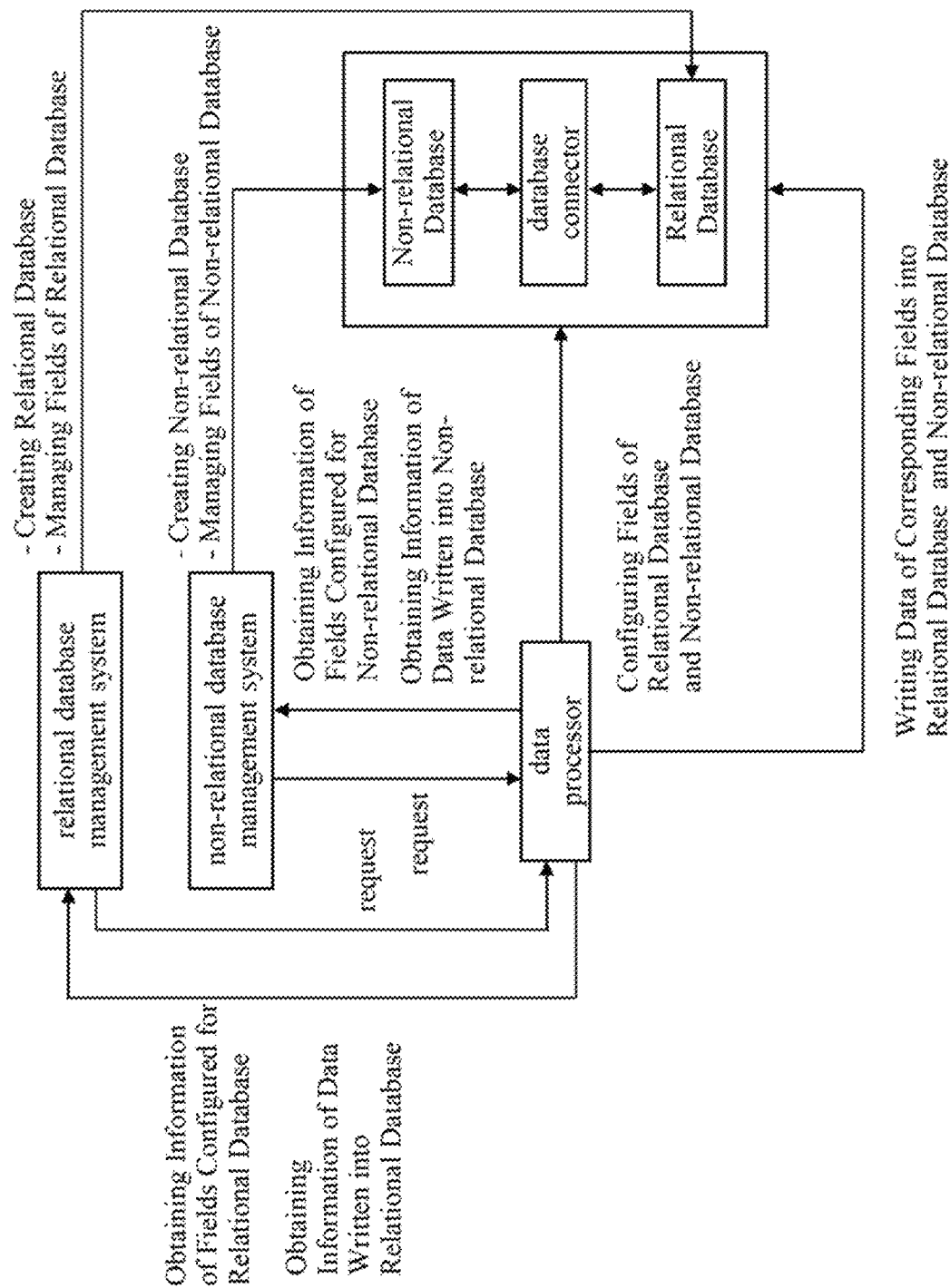
FIG. 3 is a flow diagram of data storage in storage devices according to the heterogeneous type database storage system based on optical disk of the present invention.

As shown in FIG. 3, the process for storing data into the relational database and the non-relational database in a magnetic disk storage device is as follows: when transferring data forward, requests are made to configure fields of the relational database for the data processor (130) by the relational database management system (110), then the fields of the relational database are configured by the data processor (130) based on the data type and the data length of each field of records; requests are made to configure fields of the non-relational database for the data processor (130) by the non-relational database management system (120), then the fields of the non-relational database are configured by the data processor (130) based on the data type and the data length of each field of records; requests are made to write data of the corresponding fields into the relational database for the data processor (130) by the relational database management system (110), then the data of the corresponding fields is written into the relational database by the data processor (130); requests are made to write data of the corresponding fields into the non-relational database for the data processor (130) by the non-relational database management system (120), then the data of the corresponding fields is written into the non-relational database by the data processor (130); when transferring data backward, requests are made to configure fields of the relational database for the data processor (130) by the relational database management system (110), then information of the configured fields of the relational database is returned by the data processor (130), and the information of the configured fields of the relational database is obtained by the relational database management system (110); requests are made to configure fields of the non-relational database for the data processor (130) by the non-relational database management system (120), then information of the configured fields of the non-relational database is returned by the data processor (130), and the information of the configured fields of the non-relational database is obtained by the non-relational database management system (120); requests are made to write data of the corresponding fields into the relational database for the data processor (130) by the relational database management system (110), then information of data written into the relational database is returned by the data processor (130), and the information of data written into the relational database is obtained by the relational database management system (110); requests are made to write data of the corresponding fields into the non-relational database for the data processor (130) by the non-relational database management system (120), then information of data written into the non-relational database is returned by the data processor (130), and the information of data written into the non-relational database is obtained by the non-relational database management system (120); the data written into the relation database and the corresponding data written into the non-relational database form data of integral records through the database connector (140).

Using the above method, fields of a record can be divided into two parts based on the data type and the data length of each field of records. A part of the fields are in a relational database, and the other part of the fields are in a non-relational database. The data of the corresponding fields is written into the relational database and the non-relational database respectively. It is possible that all data is input into the different type databases based on the resources disposition and the requirements, which improves the performance and the efficiency of database storage.

Figure 4:
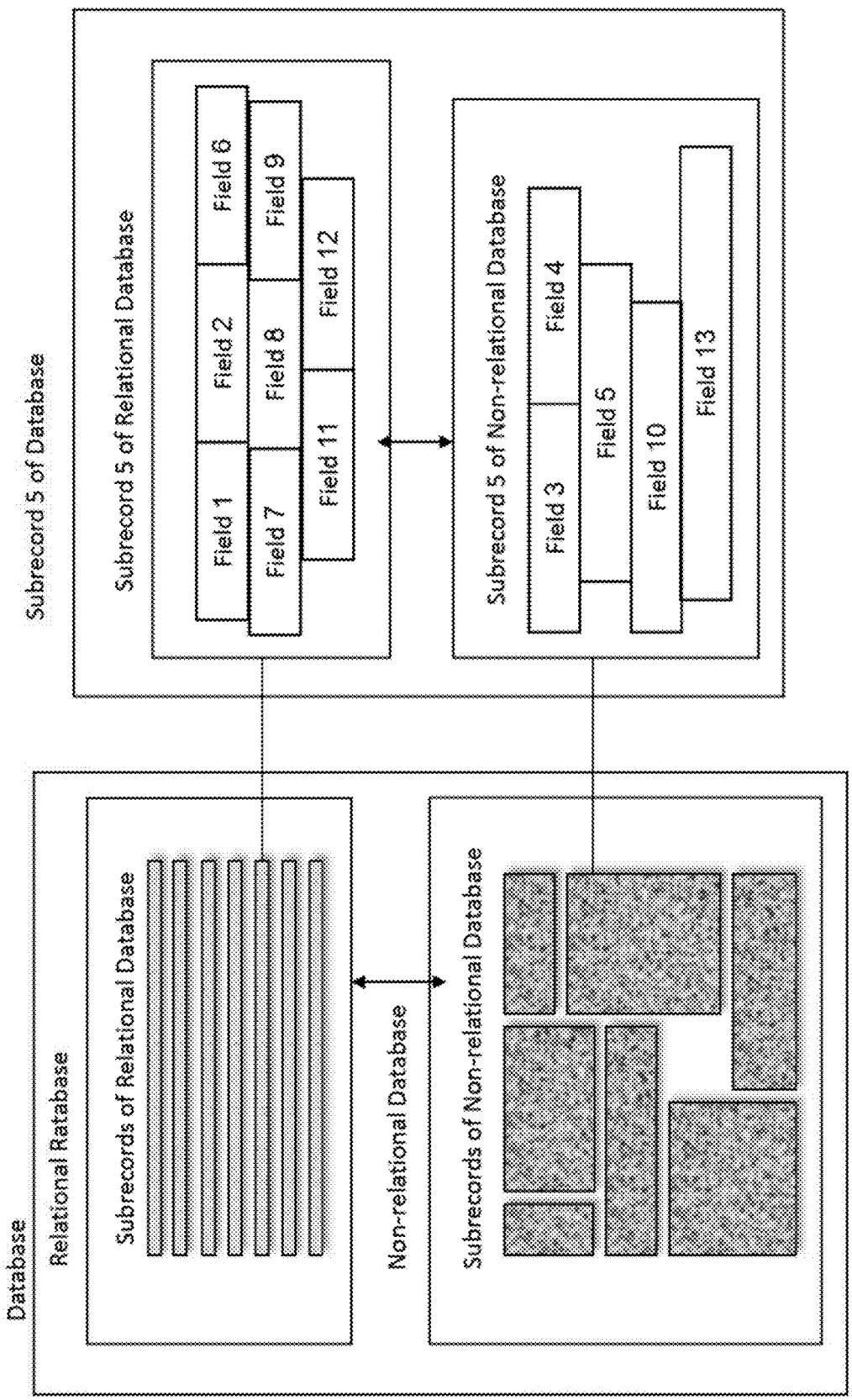
FIG. 4 is a schematic diagram of the physical structure of the database file according to the preferred embodiment of the heterogeneous type database storage system based on optical disk of the present invention.

As shown in FIG. 4, a whole database consists of a relational database and a non-relational database. A part of fields are in the relational database, and the other part of the fields are in the non-relational database. The fields of the relational database constitute a subrecord of the relational database, and the fields of the non-relational database constitute a subrecord of the non-relational database. The subrecord of the relation database and the corresponding subrecord of the non-relational database form an integral record.

In this embodiment, the fields of the relation database constitute a subrecord of the relation database, and the fields of the non-relation database constitute a subrecord of the non-relation database. The subrecord of the relation database and the subrecord of the non-relation database are the integral two parts, which ensures the integrity of the records. Therefore the methods of heterogeneous type database storage can be widely used for various types and formats of data.

Figure 5:
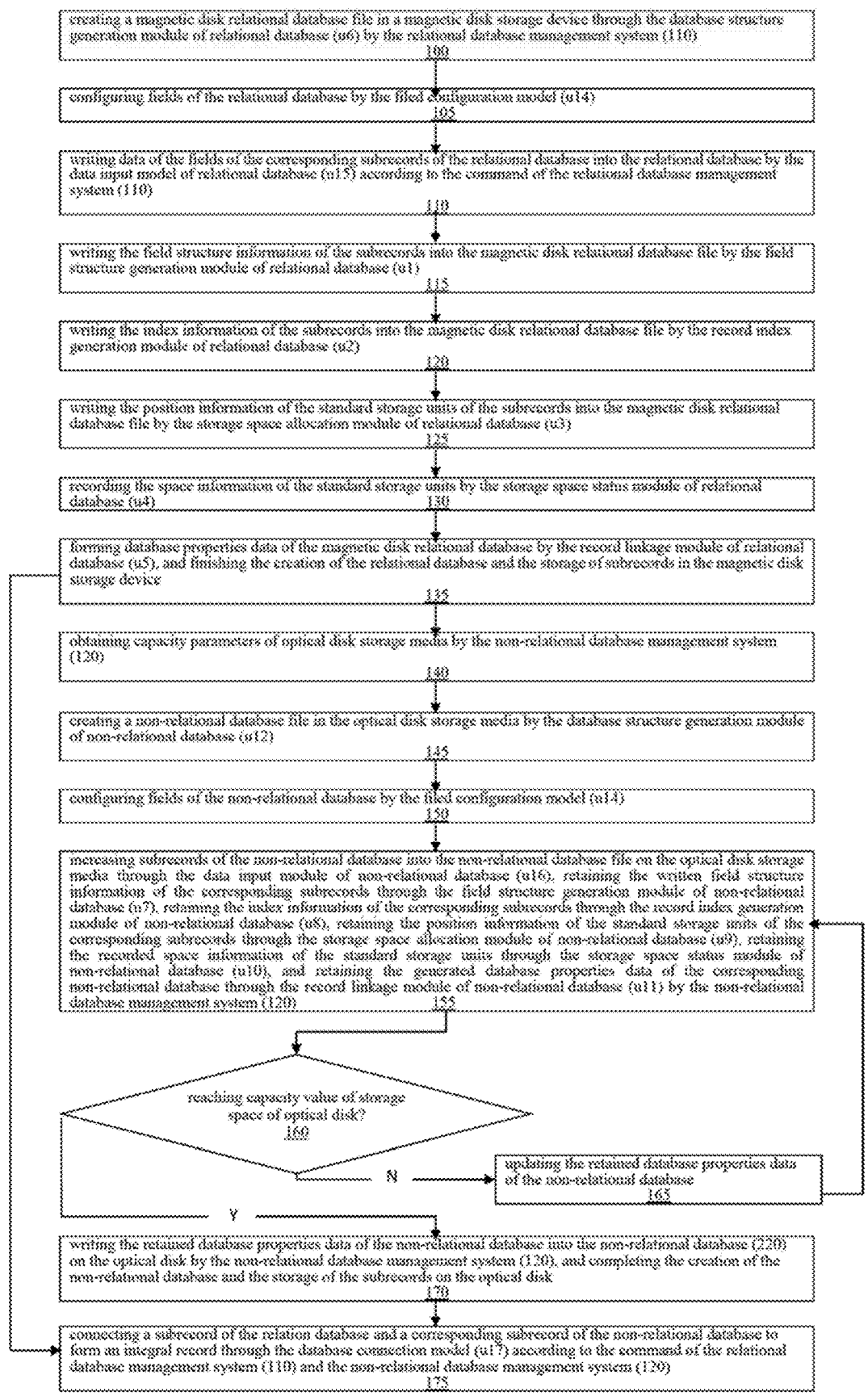
FIG. 5 is flow diagram 1 of methods for data processing using the heterogeneous type database storage system based on optical disk of the present invention.

As shown in FIG. 5, using the above mentioned heterogeneous type database storage system on optical disk, the process for creating a relational database in a magnetic disk and a non-relational database directly on an optical disk is as follows: in step 100, creating a magnetic disk relational database file in a magnetic disk storage device through the database structure generation module of relational database (u6) by the relational database management system (110); in step 105, configuring fields of the relational database by the filed configuration model (u14); in step 110, writing data of the fields of the corresponding subrecord of the relational database into the relational database by the data input model of relational database (u15) according to the command of the relational database management system (110); in step 115, writing the field structure information of the subrecords into the magnetic disk relational database file by the field structure generation module of relational database (u1); in step 120, writing the index information of the subrecords into the magnetic disk relational database file by the record index generation module of relational database (u2); in step 125, writing the position information of the standard storage units of the subrecords into the magnetic disk relational database file by the storage space allocation module of relational database (u3); in step 130, recording the space information of the standard storage units by the storage space status module of relational database (u4); in step 135, forming database properties data of the magnetic disk relational database by the record linkage module of relational database (u5), and finishing the creation of the relational database and the storage of subrecords in the magnetic disk storage device; in step 140, obtaining capacity parameters of optical disk storage media by the non-relational database management system (120); in step 145, creating a non-relational database file in the optical disk storage media by the database structure generation module of non-relational database (u12); in step 150, configuring fields of the non-relational database by the filed configuration model (u14); in step 155, increasing subrecords of the non-relational database into the non-relational database file on the optical disk storage media through the data input module of non-relational database (u16), retaining the written field structure information of the corresponding subrecords through the field structure generation module of non-relational database (u7), retaining the index information of the corresponding subrecords through the record index generation module of non-relational database (u8), retaining the position information of the standard storage units of the corresponding subrecords through the storage space allocation module of non-relational database (u9), retaining the recorded space information of the standard storage units through the storage space status module of non-relational database (u10), and retaining the generated database properties data of the corresponding non-relational database through the record linkage module of non-relational database (u11) by the non-relational database management system (120); in step 160, determining whether to reach the capacity value of the storage space, if yes, executing step 170, otherwise executing step 165; in step 165, repeating step 155, updating the retained database properties data of the non-relational database; in step 170, when the capacity of the non-relational database reaches the capacity value of the storage space of the optical disk, writing the retained database properties data of the non-relational database into the non-relational database (220) on the optical disk by the non-relational database management system (120), and completing the creation of the non-relational database and the storage of the subrecords on the optical disk; in step 175, connecting a subrecord of the relation database and a corresponding subrecord of the non-relational database to form an integral record through the database connection model (u17) according to the command of the relational database management system (110) and the non-relational database management system (120).

Figure 6:
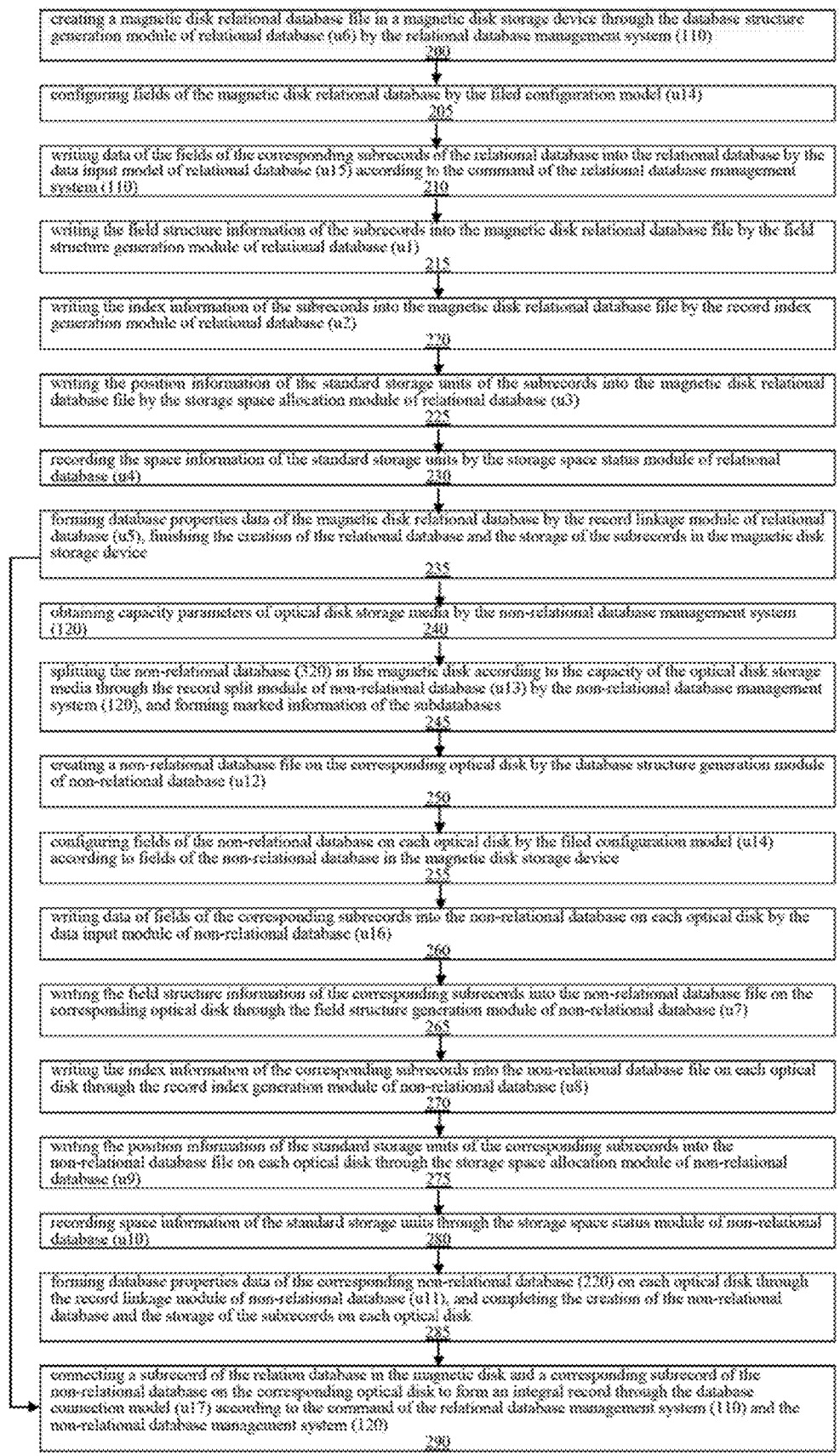
FIG. 6 is flow diagram 2 of methods for data processing using the heterogeneous type database storage system based on optical disk of the present invention.

As shown in FIG. 6, using the above mentioned heterogeneous type database storage system on optical disk, the process for creating a relational database in a magnetic disk, and transferring a non-relational database created in the magnetic disk into optical disks is as follows: in step 200, creating a magnetic disk relational database file in a magnetic disk storage device through the database structure generation module of relational database (u6) by the relational database management system (110); in step 205, configuring fields of the magnetic disk relational database by the filed configuration model (u14); in step 210, writing data of the fields of the corresponding subrecord of the relational database into the relational database by the data input model of relational database (u15) according to the command of the relational database management system (110); in step 215, writing the field structure information of the subrecords into the magnetic disk relational database file by the field structure generation module of relational database (u1); in step 220, writing the index information of the subrecords into the magnetic disk relational database file by the record index generation module of relational database (u2); in step 225, writing the position information of the standard storage units of the subrecords into the magnetic disk relational database file by the storage space allocation module of relational database (u3); in step 230, recording the space information of the standard storage units by the storage space status module of relational database (u4); in step 235, forming database properties data of the magnetic disk relational database by the record linkage module of relational database (u5), and finishing the creation of the relational database and the storage of the subrecords in the magnetic disk storage device; in step 240, obtaining capacity parameters of optical disk storage media by the non-relational database management system (120); in step 245, splitting the non-relational database (320) in the magnetic disk according to the capacity of the optical disk storage media through the record split module of non-relational database (u13) by the non-relational database management system (120), and forming marked information of the subdatabases; in step 250, creating a non-relational database file on the corresponding optical disk by the database structure generation module of non-relational database (u12); in step 255, configuring fields of the non-relational database on the corresponding optical disk by the filed configuration model (u14) according to fields of the non-relational database in the magnetic disk; in step 260, writing data of fields of the corresponding subrecords into the non-relational database on the corresponding optical disk by the data input module of non-relational database (u16); in step 265, writing the field structure information of the corresponding subrecords into the non-relational database file on each optical disk through the field structure generation module of non-relational database (u7); in step 270, writing the index information of the corresponding subrecords into the non-relational database file on each optical disk through the record index generation module of non-relational database (u8); in step 275, writing the position information of the standard storage units of the corresponding subrecords into the non-relational database file on each optical disk through the storage space allocation module of non-relational database (u9); in step 280, recording the space information of the standard storage units through the storage space status module of non-relational database (u10); in step 285, forming database properties data of the corresponding non-relational database (220) on each optical disk through the record linkage module of non-relational database (u11), and completing the creation of the non-relational database and the storage of the subrecords on each optical disk; in step 290, connecting a subrecord of the relation database in the magnetic disk and the corresponding subrecord of the non-relational database on the corresponding optical disk to form an integral record through the database connection model (u17) according to the command of the relational database management system (110) and the non-relational database management system (120).

Based on the database storage system of the above mentioned embodiment and the methods of creating a relational database and a non-relational database in a magnetic disk and on an optical disk, the concrete method of creating a relational database in a magnetic disk and a non-relational database directly on an optical disk using the heterogeneous type database storage system based on optical disk includes the following steps:

In step 1, a server is connected with a jukebox.

In step 2, a relational database management system software, a non-relational database management system software, a data processor, a database connector and a jukebox management software are installed on the server.

In step 3, a drive letter of a virtual jukebox is configured in a configuration file, MYCD=Z:\, wherein MYCD is the drive letter of the virtual jukebox, and Z is the drive letter of the jukebox.

In step 4, a relational database is created in the magnetic disk storage device, the command "D:\rbase1" is executed.

In step 5, data is input into the relational database in the magnetic disk storage device.

In step 6, a volume label "BD1" is created on an optical disk of the jukebox by the jukebox management software.

In step 7, a non-relational database is created on the optical disk of the jukebox, the command "MYCD: BD1\nrbase1" is executed.

In step 8, data is input into the non-relational database on the optical disk of the jukebox.

In step 9, the relational database in the magnetic disk storage device is connected with the non-relational database on the optical disk.

One skilled in the art will understand that the embodiments of the present invention as shown in the drawings and described above are exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

INDUSTRIAL APPLICABILITY

According to the heterogeneous database storage system based on optical disk of the present invention, the existing magnetic disk and optical disk resource can be fully utilized. The desired path for realizing the process of hierarchical storage of the structured data and the unstructured data in the magnetic disk storage device and the optical disk storage device using the relational database and the non-relational database is provided. Therefore, the market prospect is great and the industrial applicability is strong.

What is claimed is:

1. A method of improving data processing by performing a creation of a relational database in a magnetic disk storage device of a server in a computer system and a non-relational database directly in an optical disk storage device which comprises one or more optical disks in response to a request to the server, comprising the steps of:

creating a magnetic disk relational database file in a magnetic disk storage device through the database structure generation module of relational database by the relational database management system, configuring fields of the relational database by the filed configuration model, writing data of the fields of the corresponding subrecords of the relational database into the relational database by the data input model of relational database according to the command of the relational database management system, writing the field structure information of the subrecords into the magnetic disk relational database file by the field structure generation module of relational database, writing the index information of the subrecords into the magnetic disk relational database file by the record index generation module of relational database, writing the position information of the standard storage units of the subrecords into the magnetic disk relational database file by the storage space allocation module of relational database, recording the space information of the standard storage units by the storage space status module of relational database, forming database properties data of the magnetic disk relational database by the record linkage module of relational database, and finishing the creation of the relational database and the storage of subrecords in the magnetic disk storage device, obtaining capacity parameters of optical disk storage media of an optical disk storage device by the non-relational database management system, creating a non-relational database file on the optical disk storage media by the database structure generation module of non-relational database, configuring fields of the non-relational database by the filed configuration model, increasing subrecords of the non-relational database into the non-relational database file on the optical disk storage media through the data input module of non-relational database, retaining the written field structure information of the corresponding subrecords through the field structure generation module of non-relational database, retaining the index information of the corresponding subrecords through the record index generation module of non-relational database, retaining the position information of the standard storage units of the corresponding subrecords through the storage space allocation module of non-relational database, retaining the recorded space information of the standard storage units through the storage space status module of non-relational database, and retaining the generated database properties data of the corresponding non-relational database through the record linkage module of non-relational database by the non-relational database management system, determining whether to reach the capacity value of the storage space of the optical disk, if no, repeating the above operation, updating the retained database properties data of the non-relational database, when the capacity of the non-relational database reaches the capacity value of the storage space of the optical disk, writing the retained database properties data of the non-relational database into the non-relational database on the optical disk by the non-relational database management system, and completing the creation of the non-relational database and the storage of the subrecords on the optical disk, connecting a subrecord of the relation database and a corresponding subrecord of the non-relational database to form an integral record through the database connection model according to the command of the relational database management system and the non-relational database management system.

2. A method of improving data processing by performing a creation of a relational database in a magnetic disk storage device of a server in a computer system, and a transfer of a non-relational database created in the magnetic disk storage device into an optical disk storage device which comprises one or more optical disks in response to a request to the server, comprising the steps of:

creating a magnetic disk relational database file in a magnetic disk storage device through the database structure generation module of relational database by the relational database management system, configuring fields of the magnetic disk relational database by the filed configuration model, writing data of the fields of the corresponding subrecords of the relational database into the relational database by the data input model of relational database according to the command of the relational database management system, writing the field structure information of the subrecords into the magnetic disk relational database file by the field structure generation module of relational database, writing the index information of the subrecords into the magnetic disk relational database file by the record index generation module of relational database, writing the position information of the standard storage units of the subrecords into the magnetic disk relational database file by the storage space allocation module of relational database, recording the space information of the standard storage units by the storage space status module of relational database, forming database properties data of the magnetic disk relational database by the record linkage module of relational database, and finishing creation of the relational database and storage of the subrecords in the magnetic disk storage device, obtaining capacity parameters of optical disk storage media of an optical disk storage device by the non-relational database management system, splitting the non-relational database in the magnetic disk according to the capacity of the optical disk storage media through the record split module of non-relational database by the non-relational database management system, and forming marked information of the subdatabases, creating a non-relational database file on the corresponding optical disk by the database structure generation module of non-relational database, configuring fields of the non-relational database on the corresponding optical disk by the filed configuration model according to fields of the non-relational database in the magnetic disk storage device, writing data of fields of the corresponding subrecords into the non-relational database on the corresponding optical disk by the data input module of non-relational database, writing the field structure information of the corresponding subrecords into the non-relational database file on each optical disk through the field structure generation module of non-relational database, writing the index information of the corresponding subrecords into the non-relational database file on each optical disk through the record index generation module of non-relational database, writing the position information of the standard storage units of the corresponding subrecords into the non-relational database file on each optical disk through the storage space allocation module of non-relational database, recording the space information of the standard storage units through the storage space status module of non-relational database, forming database properties data of the corresponding non-relational database on each optical disk through the record linkage module of non-relational database, and completing the creation of the non-relational database and the storage of the subrecords on each optical disk, connecting a subrecord of the relation database in the magnetic disk and a corresponding subrecord of the non-relational database on the corresponding optical disk to form an integral record through the database connection model according to the command of the relational database management system and the non-relational database management system.

\* \* \* \* \*